Jan. 22, 1957 P. RICHALET 2,778,293
VENTILATING DEVICES
Filed March 23, 1953 2 Sheets-Sheet 1
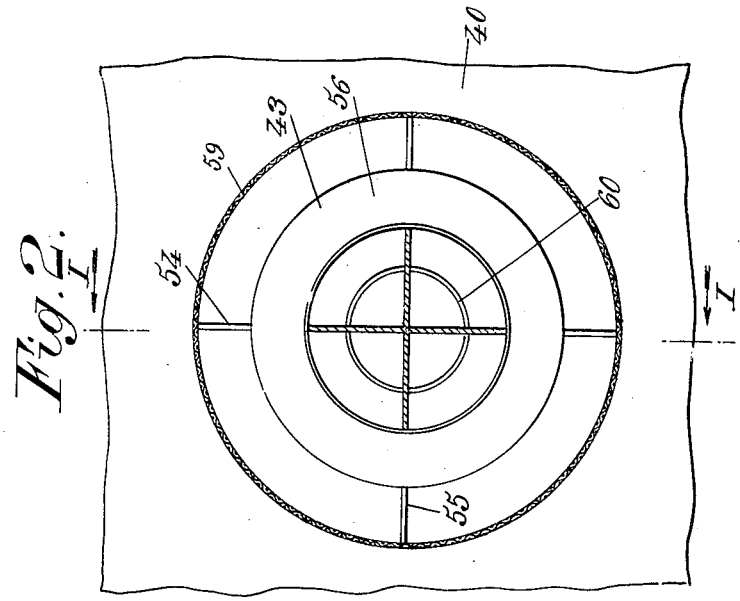
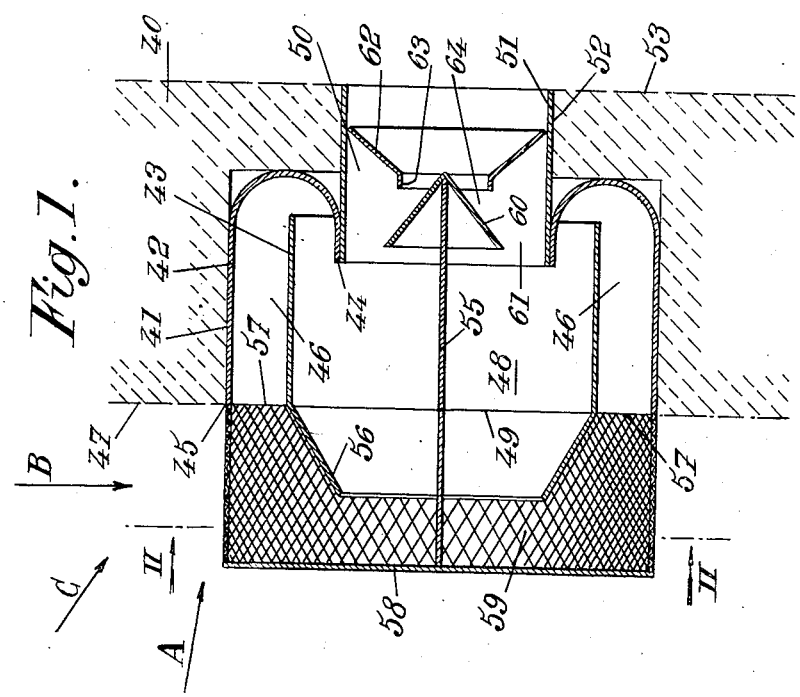

Jan. 22, 1957 P. RICHALET 2,778,293
VENTILATING DEVICES
Filed March 23, 1953 2 Sheets-Sheet 2

United States Patent Office 2,778,293
Patented Jan. 22, 1957

2,778,293

VENTILATING DEVICES

Paul Richalet, Le Chesnay, France

Application March 23, 1953, Serial No. 343,998

Claims priority, application France February 23, 1953

3 Claims. (Cl. 98—42)

In my U. S. patent application Ser. No. 321,073, filed November 18, 1952, I described devices for ventilating rooms, vehicles (railway cars, lorries, motor cars, airplanes, ships), or for evacuating the products of combustion of heating apparatus or the vapours and gases disengaged under the hoods of laboratories or cooking apparatus.

The object of my invention is to provide improvements in such devices.

Preferred embodiments of my invention will be hereinafter described with reference to the accompanying drawings, given merely by way of example, and in which:

Fig. 1 is a sectional view on the line I—I of Fig. 2 of a ventilating device made according to still another embodiment of my invention;

Fig. 2 is a sectional view on the line II—II of Fig. 1.

Figure 3:
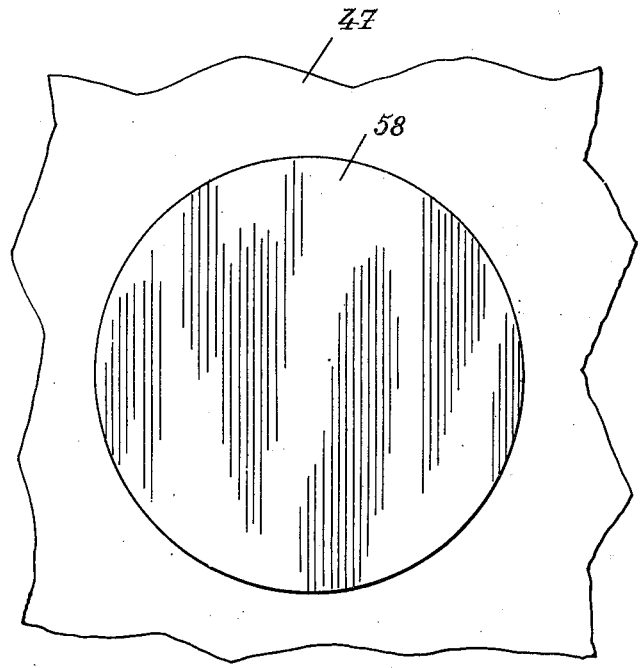
Fig. 3 is a front view of the device.

In the construction shown by Figs. 1 and 2, the wall 40 which separates the room to be ventilated from the external atmosphere is provided with a circular cylindrical hole 41 extending from the outer face 47 of said wall to a distance from the inner face 53 of said wall; a passage 52 of smaller diameter connects this hole with the inside of the room to be ventilated. The apparatus comprises a piece 42 including a cylindrical outer portion 45 fitting against the cylindrical wall of the above mentioned hole 41, a short cylindrical portion 44 of a diameter smaller than that of portion 45 and a toroidal bent portion joining the two cylindrical portions. Portion 45, instead of being cylindrical may be slightly conical and flaring toward the outside. Mounted coaxially with portions 45 and 44, there is a cylindrical piece 43 located at a smaller distance from portion 44 than from portion 45. I thus provide a passage 46 bent at 180° and the inlet of which, that is to say its end opening into the external atmosphere, is larger than its outlet, i. e. its end opening into the chamber 48 limited by cylindrical piece 43. Chamber 48 communicates, on the one hand, with the external atmosphere at 49 and, on the other hand, with the room to be ventilated through a passage 50 limited by a cylindrical conduit 51 housed in the circular hole 52 above referred to. Conduit 51 is coaxial with portions 45 and 44.

Figure 4:
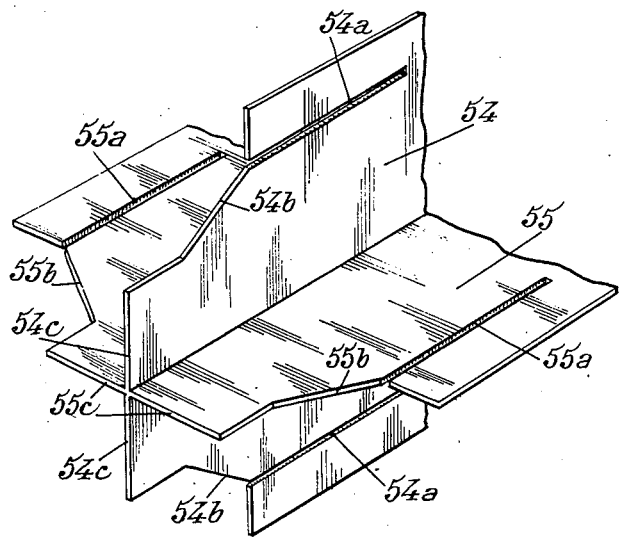
Fig. 4 is a perspective view of an element of the structure of Figs. 1 and 2.

The apparatus shown by the drawing further includes two diametrical partitions 54 and 55 at right angles to each other extending to the external wall 42 so that they can support cylindrical piece 43. For this purpose, partitions 54 and 55 are provided with slots 54a and 55a (Fig. 4) into which cylindrical piece 43 is engaged.

The external edge of cylindrical piece 43 carries a frusto-conical extension 56 acting as a screen between the inlet 57 of passage 46 and the outlet 49 of chamber 48 toward the external atmosphere. This frusto-conical part 56 is applied against oblique portions 54b and 55b (Fig. 4) of partitions 54 and 55.

Opposite said inlet 57 and said outlet 49 there is provided a circular screen 58 constituted by a solid disc supported by the external piece 42 through suitable means, for instance by a cylindrical grid 59 as shown by the drawing. Disc 58 is applied against the end edges 54c and 55c (Fig. 4) of partitions 54 and 55.

Partitions 54 and 55 may extend, as shown by the drawing, beyond the external face 47 of wall 40 and as far as circular screen 58.

When the wind is exactly perpendicular to the outer face of wall 40, screen 58 prevents any inflow of air into the device. The device is then inoperative. However, the wind never remains for any appreciable time exactly perpendicular to the outer face of wall 40. In practice, the direction of the wind will always be changing with respect to this perpendicular direction. As soon as the direction of the wind makes an angle even so small as 2 or 3° with the perpendicular to the outer face 47 of the wall, for instance when the wind is in the direction shown by arrow A, it enters passages 46 on one side of the device and reaches the throat portion between piece 43 and portion 44, whereby a substantial suction is thus produced. This suction, acting through communicating passage 50, draws air from the room to be ventilated into chamber 48, and thence to the outlet 49 thereof and to the outside through the space between screen 58 and frusto-conical extension piece 56.

When the wind is in the direction of arrow B, i. e., is parallel to the external face 47 of the wall (which also is a limit case), it enters through the passage of gradually decreasing cross section formed between screen 58 and frusto-conical piece 56, and a suction is produced at the throat formed between screen 58 and piece 56. This suction draws air from the room to be ventilated through chamber 48 and passage 50, this air being evacuated to the outside. In this case there is practically no circulation of air through passages 46.

When the wind is blowing from an oblique direction with respect to the external face 47 of the wall, as shown by arrow C, a portion of the air enters through passage 46 and another portion through the passage between screen 58 and frusto-conical piece 56. The ratio of the amount of air flowing through these two respective passages depends upon the obliquity of the wind direction C with respect to the wall.

According to my invention, in the passage 50 which connects chamber 48 with the room to be ventilated, I provide a baffle device capable of creating a high resistance to the flow of air from chamber 48 toward the room to be ventilated through said conduit 51. On the contrary, this baffle device presents practically no obstacle to the flow of air from the room to be ventilated toward chamber 48.

For this purpose, this baffle device includes a conical piece 60 coaxial with cylindrical conduit 51 and having its apex turned toward the room to be ventilated. The diameter of the base of the cone is substantially smaller than that of conduit 51 so that there is left a relatively great annular interval 61 between these pieces 51 and 60. Conical piece 60 is supported for instance by partitions 54 and 55.

In conduit 51, on the end thereof adjacent to the room to be ventilated, there is provided a frusto-conical partition 62 carrying a cylindrical extension 63 turned toward chamber 48. This partition 62 is fixed, along its larger base, to the inner wall of conduit 52. Between cylindrical extension 63 and the wall of conical piece 60, there is provided an annular interval 64 for the passage of air therethrough.

I might mount several such devices in conduit 51.

Thus, when air is flowing out from the room to be ventilated toward the outside, the baffle device presents practically no resistance to said flow. On the contrary, when air has a tendency to pass from chamber 48 through conduit 51 into the room to be ventilated, conical piece 60 and partition 62 prevent its flow so that finally this air is deflected toward the outlet 49 of chamber 48 and the external atmosphere.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A ventilating device for causing a gaseous fluid to flow out from a space to be ventilated to the external atmosphere under the effect of wind blowing in said external atmosphere, said space being separated from said atmosphere by a wall provided with a hole at least substantially symmetrical about an axis transverse to said wall, this device comprising, in combination, an annular piece fitted in said hole and including an at least substantially cylindrical portion coaxial with said hole from its outer edge along the side wall thereof, an at least substantially cylindrical portion coaxial with said hole and extending inside said first mentioned cylindrical portion, said second mentioned cylindrical portion being shorter in the direction of said axis than said first mentioned cylindrical portion, and a toroidal curved portion joining the inner ends of said two cylindrical portions, a cylindrical piece coaxial with said two cylindrical portions and disposed intermediate said cylindrical portions, but located at a smaller distance from the second mentioned cylindrical portion than from the first mentioned one, the outer edge of said cylindrical piece being located substantially flush with the outer face of said wall and the inner edge thereof being at a distance from said toroidal curved portion whereby said two pieces form between them an annular passage bent at 180°, starting from said outer face of the wall and opening into the cylindrical chamber formed inside said cylindrical piece, a frusto-conical extension converging toward the external atmosphere from said outer edge of said cylindrical piece, a solid screen transverse to said axis carried by said annular piece at a distance from the outer face of said wall on the outside thereof, the edge of said screen being substantially opposite the edge of said annular piece, the second cylindrical portion of said annular piece defining on its inside a central passage connecting said cylindrical chamber with the space, on the inner side of said wall, to be ventilated, and baffle means located at least partly in said central passage for imposing a substantial resistance to the flow of air therethrough from said cylindrical chamber toward said space and a low resistance to the flow of air therethrough from said space toward said cylindrical chamber.

2. A device according to claim 1 in which said baffle means include, mounted coaxially with said annular piece, a conical piece of a diameter at its base smaller than the diameter of said central passage, this conical piece having its apex turned toward said space, and, between said conical piece and said space, a frusto-conical partition having its larger base of a diameter substantially equal to that of said central passage and converging toward said conical piece to a substantial distance therefrom.

3. A ventilating device for causing a gaseous fluid to flow out from a space to be ventilated to the external atmosphere under the effect of wind blowing in said external atmosphere, said space being separated from said atmosphere by a wall provided with a hole at least substantially symmetrical about an axis transverse to said wall, this device comprising, in combination, an annular piece fitted in said hole and including an at least substantially cylindrical portion coaxial with said hole and extending from its outer edge along the side wall thereof, an at least substantially cylindrical portion coaxial with said hole and extending inside said first mentioned cylindrical portion, said second mentioned cylindrical portion being shorter in the direction of said axis than said first mentioned cylindrical portion, and a toroidal curved portion joining the inner ends of said two cylindrical portions, a cylindrical piece coaxial with said two cylindrical portions and intermediate between them, but located at a smaller distance from the second mentioned cylindrical portion than from the first mentioned one, the outer edge of said cylindrical piece being located substantially flush with the outer face of said wall and the inner edge thereof being at a distance from said toroidal curved portion whereby said two pieces form between them an annular passage bent at 180°, starting from said outer face of the wall and opening into the cylindrical chamber formed inside said cylindrical piece, at least one diametral partition dividing this cylindrical chamber in at least two compartments, a frusto-conical extension converging toward the external atmosphere from said outer edge of said cylindrical piece, a solid screen transverse to said axis carried by said annular piece at a distance from the outer face of said wall on the outside thereof, the edge of said screen being substantially opposite the edge of said annular piece, the second cylindrical portion of said annular piece defining on its inside a central passage connecting said cylindrical chamber with the space, on the inner side of said wall, to be ventilated, and baffle means located at least partly in said central passage for imposing a substantial resistance to the flow of air therethrough from said cylindrical chamber toward said space and a low resistance to the flow of air therethrough from said space toward said cylindrical chamber.

References Cited in the file of this patent

UNITED STATES PATENTS

| | | |
|---|---|---|
| 272,158 | Rowan | Feb. 13, 1883 |
| 317,294 | Carll | May 5, 1885 |
| 1,220,290 | Townsend | Mar. 27, 1917 |
| 1,264,361 | Bell | Apr. 30, 1918 |
| 1,811,323 | Lejay | June 23, 1931 |
| 2,514,247 | Leardi et al. | July 4, 1950 |

FOREIGN PATENTS

| | | |
|---|---|---|
| 2,120 | Great Britain | July 28, 1870 |